(12) United States Patent
Switlik et al.

(10) Patent No.: US 7,139,674 B2
(45) Date of Patent: Nov. 21, 2006

(54) SYSTEMS AND METHODS FOR FILTERING AND SMOOTHING DATA

(75) Inventors: John M. Switlik, Wichita, KS (US); Frederick Klein, Seattle, WA (US)

(73) Assignee: The Boeing Company, Chicago, IL (US)

(*) Notice: Subject to any disclaimer, the term of this patent is extended or adjusted under 35 U.S.C. 154(b) by 244 days.

(21) Appl. No.: 10/848,448

(22) Filed: May 18, 2004

(65) Prior Publication Data

US 2005/0261873 A1    Nov. 24, 2005

(51) Int. Cl.
*G06F 17/18* (2006.01)

(52) U.S. Cl. .............................. 702/179; 702/191
(58) Field of Classification Search ............... 702/179, 702/66, 67, 181, 189, 191
See application file for complete search history.

(56) References Cited

U.S. PATENT DOCUMENTS

| | | | |
|---|---|---|---|
| 6,112,161 A * | 8/2000 | Dryden et al. ............... 702/85 |
| 6,268,871 B1 * | 7/2001 | Rice et al. ............... 345/442 |
| 6,882,958 B1 * | 4/2005 | Schmidt et al. ............. 702/179 |
| 2002/0002420 A1 * | 1/2002 | Hirai et al. ................ 700/187 |
| 2004/0148139 A1 * | 7/2004 | Nguyen et al. ............. 702/189 |

* cited by examiner

*Primary Examiner*—Marc S. Hoff
*Assistant Examiner*—Janet L Suglo
(74) *Attorney, Agent, or Firm*—Lee & Hayes, PLLC

(57) ABSTRACT

Methods and systems for generating a curve that represents raw data are provided. In one embodiment, the system includes memory for storing a curve generation application program, a user interface, a display device, and a processor. The processor executes the stored curve generation application program and is coupled to the memory, the user interface, and the display device. The executed curve generation application program includes a first component that receives raw data and a second component that allows for the manual or default setting of a base value for defining weight values for each data point of inputted raw data. A third component generates a curve for representing the raw data based on at least a portion of the data points and the set base value. A fourth component outputs the generated curve to the display device.

44 Claims, 13 Drawing Sheets

SYSTEMS AND METHODS FOR FILTERING AND SMOOTHING DATA

FIELD OF THE INVENTION

This invention relates to data analysis and, more specifically, to filtering and smoothing of data for improving analysis.

BACKGROUND OF THE INVENTION

Analysis of raw test data has required the need for performing filtering and smoothing of the data in order to allow for an effective analysis. Many times, researchers only look for visual evidences of smoothness. For instance, this evidence might be shapes that are generally pleasing to the eye. However, data requirements can be more stringent. For instance, to be useful to a program, a curve must be numerically smooth. This may be a difficult property to attain without solving complicated linear equations.

In the experimental data context, physical measurements introduce error that can be both random and specific to a domain. Methods to handle error have been shown to be problematic. In many cases, there is a shifting of the data caused by averaging in time. As well, the resulting model has poorly defined derivatives.

Due to the problem of obtaining good and smooth data, researchers have been reduced to hand calculations to preserve data integrity. These hand calculations rely on many visual cues. However, they cannot produce the quality of data or derivatives needed to support modeling, such as simulation or dynamic data analysis.

One common approach to both filtering and smoothing of raw data is to use a sliding window that crosses multiple data points, and to apply one of a variety of schemes to smooth the data. The schemes include linear or non-linear methods. An example linear method would parametrically set the size of the window, thereby controlling the number of coefficients that are used. The main complaint about this method is that it causes a shift in the sampling phase. Another approach applies least-squares analysis on the fit error in order to determine a curve to represent the data. This method is not sensitive to domain constraints, such as the minimal temperature delta that makes sense in the domain, such as for a particular alloy of a metal. There are many other approaches that require knowledge and insight into higher-order mathematics, such as analysis and filtering in frequency space. Such methods presuppose that the researcher knows how to distinguish between noise and signal within the data stream.

Therefore, there exists a need for an improved data filtering and smoothing process that can be used in a variety of environments, that can appeal to the intuition, and that can provide highly desirable properties of benefit to the researcher.

SUMMARY OF THE INVENTION

The present invention is directed to methods and systems for generating a curve that represents raw data. In one embodiment, the system includes memory for storing a curve generation application program, a user interface, a display device, and a processor. The processor executes the stored curve generation application program and is coupled to the memory, the user interface, and the display device. The executed curve generation application program includes a first component that receives raw data and a second component that allows for the manual or default setting of a base value for defining weight values for each data point of inputted raw data. A third component generates a curve for representing the raw data based on at least a portion of the data points and the set base value. A fourth component outputs the generated curve to the display device.

In accordance with further aspects of the invention, the base value is information for defining a tube. The information for defining the tube includes a radius value for the tube.

In accordance with other aspects of the invention, the curve generation application program further includes a fifth component that sets a threshold value for indicating an allowable percentage of data points not used during the generation of the curve. The third component is further based on the set threshold value.

In accordance with still further aspects of the invention, the third component generates error information relating to how well the generated curve fits with at least a portion of the data points and the fourth component outputs the generated error information to the memory or the display device.

In accordance with yet other aspects of the invention, the second component sets a base curve and a weight value for each of the data points, determines error values for each of the data points based on the base curve, adjusts the curve based on the determined error values, adjusts the weight values based on the determined error values, determines error values for each of the data points having a weight value greater than a predefined weight value threshold, adjusts the curve based on the error values determined, and repeats adjusting the weight values until a complete state is asserted.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to apparatus and methods for more effectively analyzing raw data. Many specific details of certain embodiments in the invention are set forth in the following description and in FIGS. 1–10 to provide a thorough understanding of such embodiments. One skilled in the art, however, will understand that the present invention may have additional embodiments, or that the present invention may be practiced without several of the details described in the following description.

Figure 1:
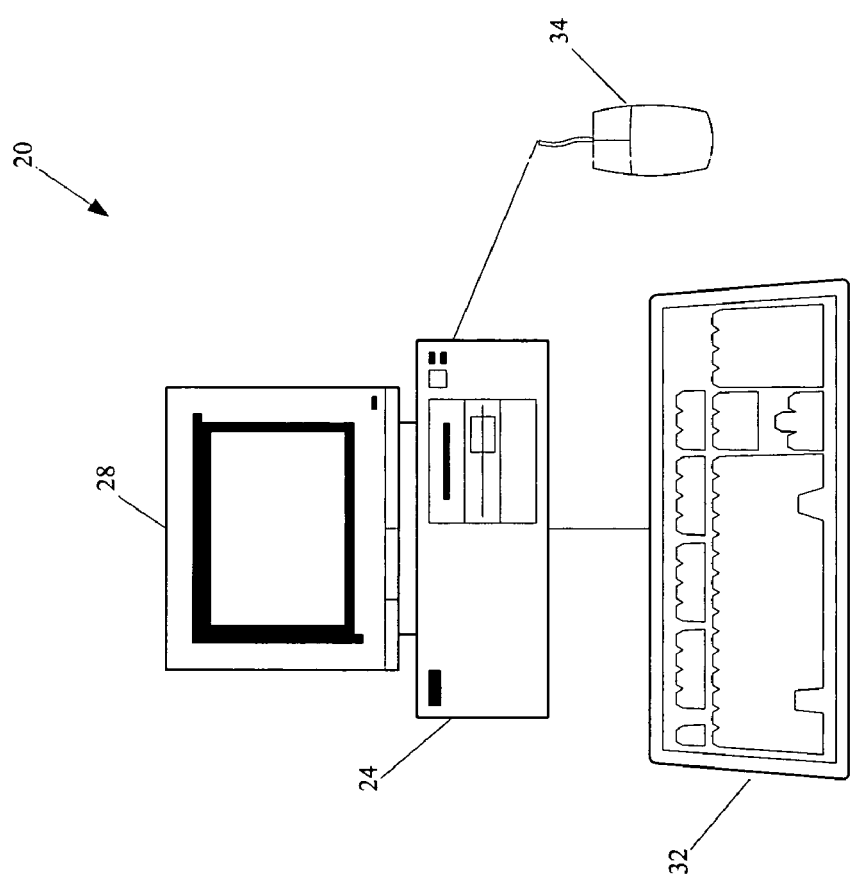
FIG. 1 illustrates an example computer system for performing the processes of the present invention.

FIG. 1 illustrates a computer system 20 that includes a processor with associated memory 24, a display device 28, and user interface devices such as a keyboard 32 and a mouse 34. The processor and memory 24 execute an application program for generating an optimized curve and first and second derivative curves of inputted raw data. The generated optimized curve and the first and second derivative curves of the inputted raw data are displayed on the display device 28 for analysis by a user.

The computer system 20 may be linked directly or indirectly with devices that gather raw data. Devices that gather raw data can be any of a number of different types of devices such as temperature or stress sampling equipment, or any other device that gathers data. Also, the computer system 20 may analyze pre-existing systems in order to allow reverse engineering by performing an analysis of data of the existing system. FIGS. 11A–C and 12A–C, described below, provide an example of applying the computer system 20 to reverse engineering data for purposes of extracting a feature from a cloud of points.

The computer system 20 is a general purpose digital computer. It can be appreciated that the computer system 20 may be linked to other computer systems and computer system components across a public or private data network.

Figure 2:
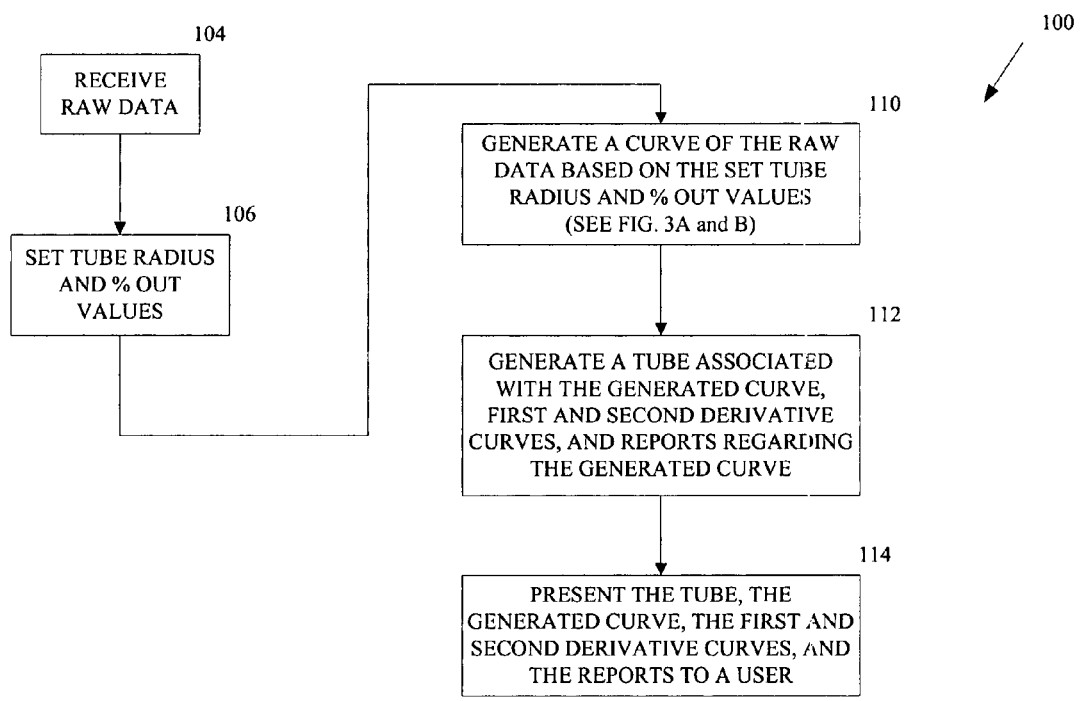
FIGS. 2, 3A, and 3B illustrate an exemplary process performed by the computer system shown in FIG. 1 for providing an optimal output curve of received raw data.

FIGS. 2 and 3 illustrate processes performed by the application program stored and executed by the processor and memory 24 of the computer system 20. The processes of FIGS. 2 and 3 receive and analyze raw data and output optimized curves according to the received raw data. Referring to FIG. 2, an exemplary process 100 in accordance with an embodiment of the present invention begins by receiving raw data at a block 104. At a block 106, a user is prompted to set a tube radius and a percentage of points outside a tube. The set tube radius defines the radius of a cylindrical tube that is used to identify weight values of raw data points relative to a curve. The percentage of points outside of the tube is a threshold value set to limit or identify what percentage of data points can be outside of the defined tube. It can be appreciated that the tube radius and the percentage of data points outside the tube may be automatically set to default values.

At a block 110, the application program generates a curve of the raw data based on the tube radius and percentage of data points outside the tube. This step is described in more detail below with reference to FIGS. 3A and 3B. At a block 112, the application program generates images of the generated curve, the tube associated with the curve, first and second derivatives of the generated curve, and error reports regarding the generated curve. At a block 114, the application presents or displays the generated tube, curve, first and second derivative curves, and the reports to a user.

Figure 3A:
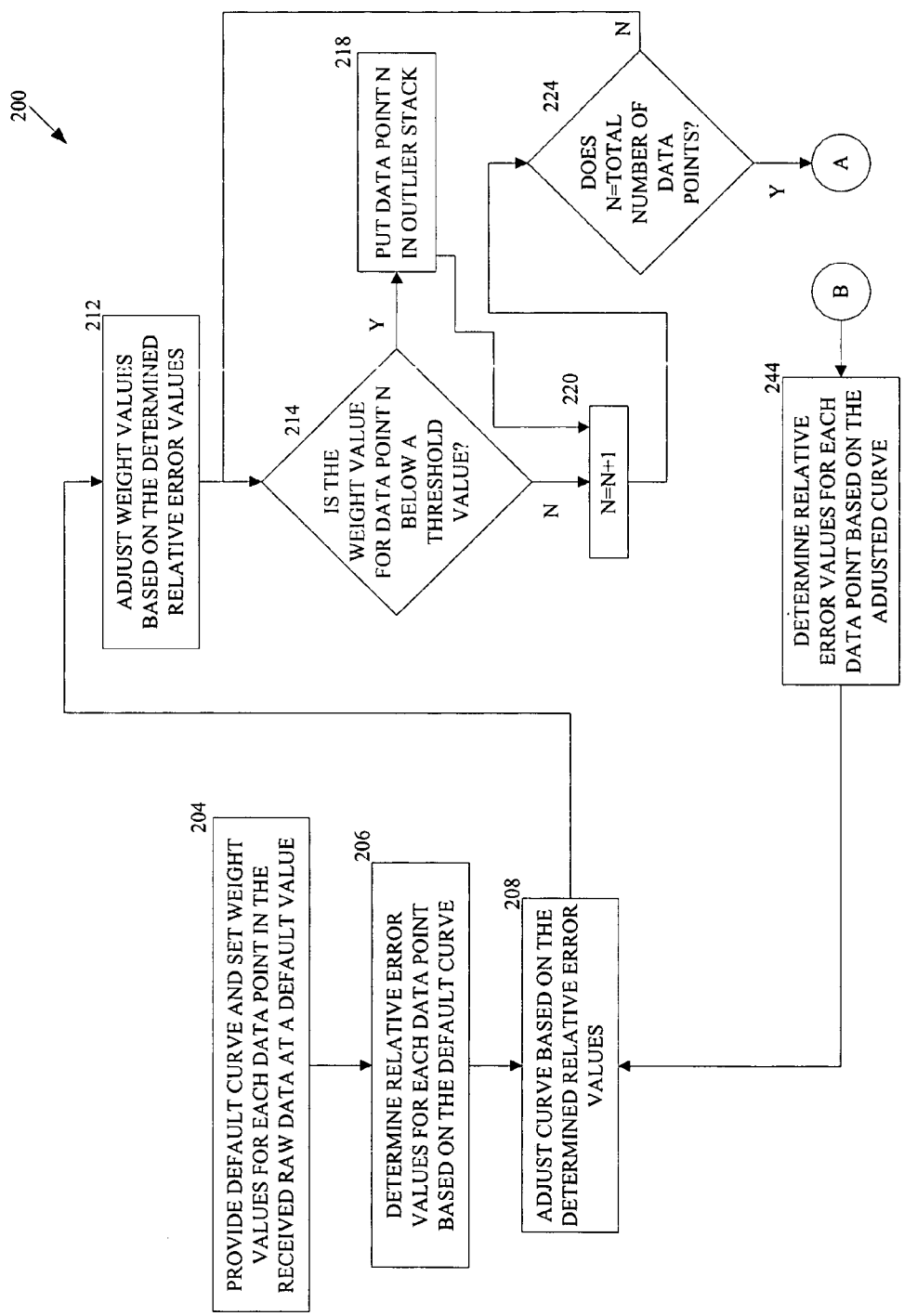
Figure 3B:
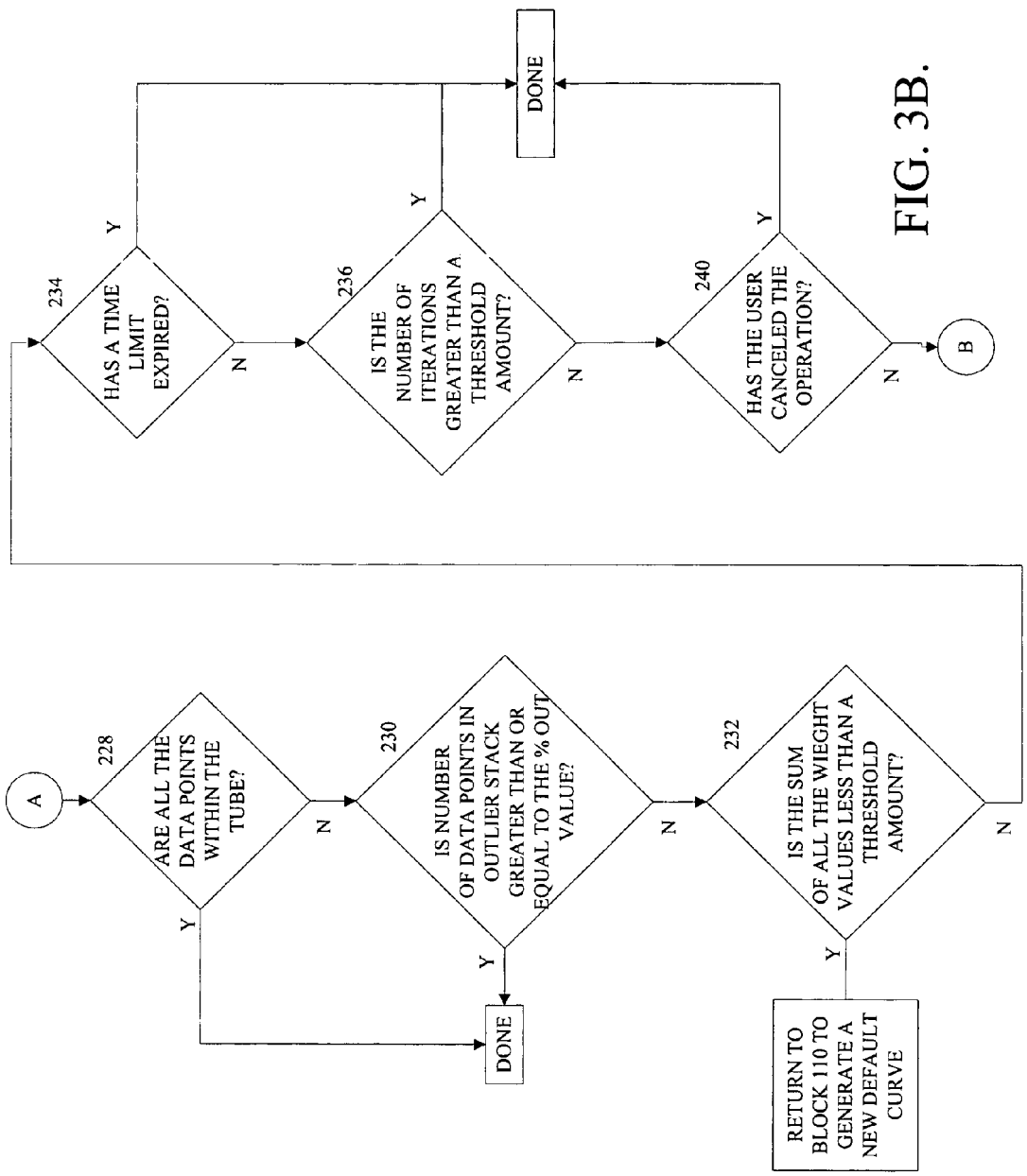

Referring now to FIGS. 3A and 3B, a process 200 is shown for generating an optimized curve of the raw data based on the set tube radius and percentage of data points outside the tube (block 110, FIG. 2) in accordance with an embodiment of the present invention. At a block 204, a default curve is provided relative to the first data point and the last data point and weight values are set for each data point of the received raw data. In this embodiment, weight values for data points vary from 0 to 1 and the default setting that occurs at the block 204 is to set the weight values for each data point at 1, thus meaning that data points are assumed to be within the tube. At a block 206, the program determines relative error values for each data point based on the provided default curve and the set tube radius. At a block 208, the program automatically adjusts the default curve based on the determined relative error values. The curve is a non-uniform rational b-spline that includes a plurality of components, such as b-spline coefficients, knots, and parameters (a mapping between the data points and the b-spline coefficients). Due to the high-continuity desired, b-spline coefficients and knots are paired. The b-spline coefficients (knots) of the curve are adjusted based on the relative error values prior to optimization. For each iteration, one knot (with its coefficient) is inserted where it is expected to do the most good for the fit (generally in a region of the most error). This step also provides one more degree of freedom to the optimizer. Within the optimization step (described below), the parameters can change via call-back according to knowledge obtained by movement through the optimization space. Next, at a block 212, the weight values for each of the data points are adjusted based on the determined relative error values. If a data point is within the tube, the weight value equals 1, otherwise, the weight value is equal to or greater than 0 and less than 1.

At a decision block 214, the program determines if the weight value for a data point is below a threshold value. If it is determined that the weight value for a data point is below the threshold value, at a block 218, the program puts that data point into an outlier stack (i.e., removes the data point from the set of data points used to adjust the curve) and then proceeds to a block 220 to process the next data point. If the weight value for the data point is not below the threshold value, the program proceeds to the next data point, see the block 220. At a decision block 224, the program returns to the decision block 214 if not all the data points have been analyzed with regard to their weight value.

If all the data points have been analyzed as determined by the decision block 224, the program continues to the decision block 228 (FIG. 3B). At the decision block 228, the program determines if all the data points are within the tube defined by the tube radius and the present curve. If all the data points are within the tube, then the curve accurately describes the raw data, the curve-generating process 200 is complete, and the process 100 continues to the block 112 (FIG. 2). If not all the data points are within the tube at a decision block 228, then at a block 230, the program determines if the number of data points in the outlier stack is greater than or equal to the percentage of data points outside of the tube. If the percentage data points in the outlier stack are greater than or equal to the pre-set percentage of data points outside the tube (block 230), the curve-generating process 200 (FIGS. 3A and 3B) is complete, and the process 100 continues to the block 112 (FIG. 2).

As further shown in FIG. 3B, if the determination at block 230 is negative, then at a decision block 232, the process 200 identifies whether a threshold of acceptable error values has been reached. If it is determined that the sum of all the weight values is less than the threshold amount, then it is apparent that the present curve is not effective for describing the present data points, and the process 200 returns to the block 110 (FIG. 2) for generating a new curve. If at the decision block 232 the weight values are greater than the threshold amount, the process continues to a decision block 234 that determines if a time limit has expired. The decision block 234 keeps the program from performing an infinite loop or just processing data for too long. If the time limit has expired, the program is complete and returns to the block 112 (FIG. 2).

If a time limit has not expired, the process continues to a decision block 236 that determines if the number of iterations is greater than a threshold amount. In one particular embodiment, an iteration is performed every time the curve and weight values are adjusted, the blocks 208 and 212. If the number of iterations are greater than the threshold amount, the program is complete and returns to the block 112 (FIG. 2). If the number of iterations is less than the threshold amount, the process continues to a decision block 240 where the program is complete if the user has performed a cancellation operation. Otherwise, the program returns to FIG. 3A at a block 244. At the block 244, the program determines relative error values for each data point based on the most recently adjusted curve, and then returns to the block 208 where the curve is adjusted based on these newly determined relative error values. It can be appreciated that the decision steps in the process described above may be placed in various order without departing from the spirit and scope of the invention.

During each iteration of the process 100, spline knowledge is used to adjust the working elements (coefficients/knots, parameters) of the present curve. For instance, where there is a collection of data points outside the tube that are not identified as outliers, the curve may be partitioned into another segment in order to move that portion of the curve closer to those data points. In certain situations, the program will put all weights back to 1.0 in order to force recalculation.

For each iteration, an objective function is applied and information about a problem space is used to guide Sparse Optimal Control Software (SOCS). In this case, the problem space uses spline representation. The objective function is stated as:

$$fbar = (1.-gamma)*ssq/npt + gamma*fpart$$

where:
ssq=the sum of the squared errors for each point that is in scope,
fpart=smoothness information, and
gamma=a factor that allows ssq to have more weight than fpart (i.e., fit is more important than smoothness).

The call to SOCS is two-way which allows the program to ask for information as it is needed. Sparse techniques allow faster computation in general than do non-sparse techniques. The information given to SOCS allows the loop to hypothesize and test minor modifications at locations on the curve during one iteration. Between iterations, this routine evaluates the curve at each point. The fit information is fed to an Outlier routine, which takes points out of scope or adjusts their weights according to the error analysis. The object function is re-calculated for the next iteration. Next, fbar and fpart are re-adjusted with new curve information. For each point with an error greater than the tube radius, the error is reported.

In the Outlier routine, the fit information is used to take points out of scope up to the percentage specified by percent outlier. Points can have weights between 0 and 1. Points with a weight of 1.0 are in the tube. Points outside the tube have weights less than 1.0 sufficient to influence the solution as if they are in the tube. Once a point is weighted zero, it is out of scope, and it does not influence the solution. The technique used is a form of robust regression.

Figure 4:
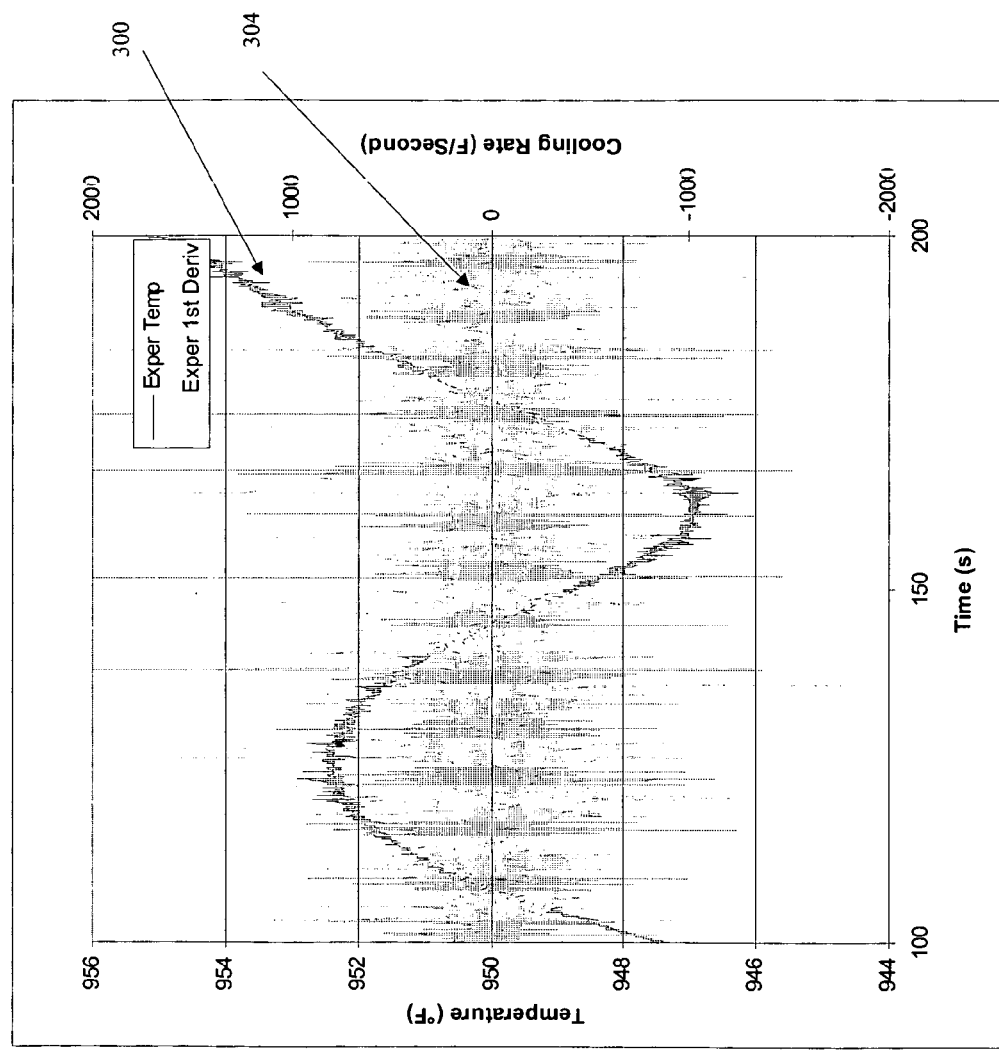
FIG. 4 illustrates a graph of received raw data and a first derivative of the received raw data.

FIGS. 4–10 illustrate an example processing of a 200 second interval of raw data associated with the cooling of an aluminum alloy in accordance with an embodiment of the invention. Referring to FIG. 4, a graph is shown that illustrates a raw temperature cooling data 300 graphed relative to temperature and time, and a first derivative 304 of the raw temperature cooling data 300 graphed relative to time and cooling rate. The data illustrated in FIG. 4 may be presented to the user prior to execution of the process 100.

Figure 5:
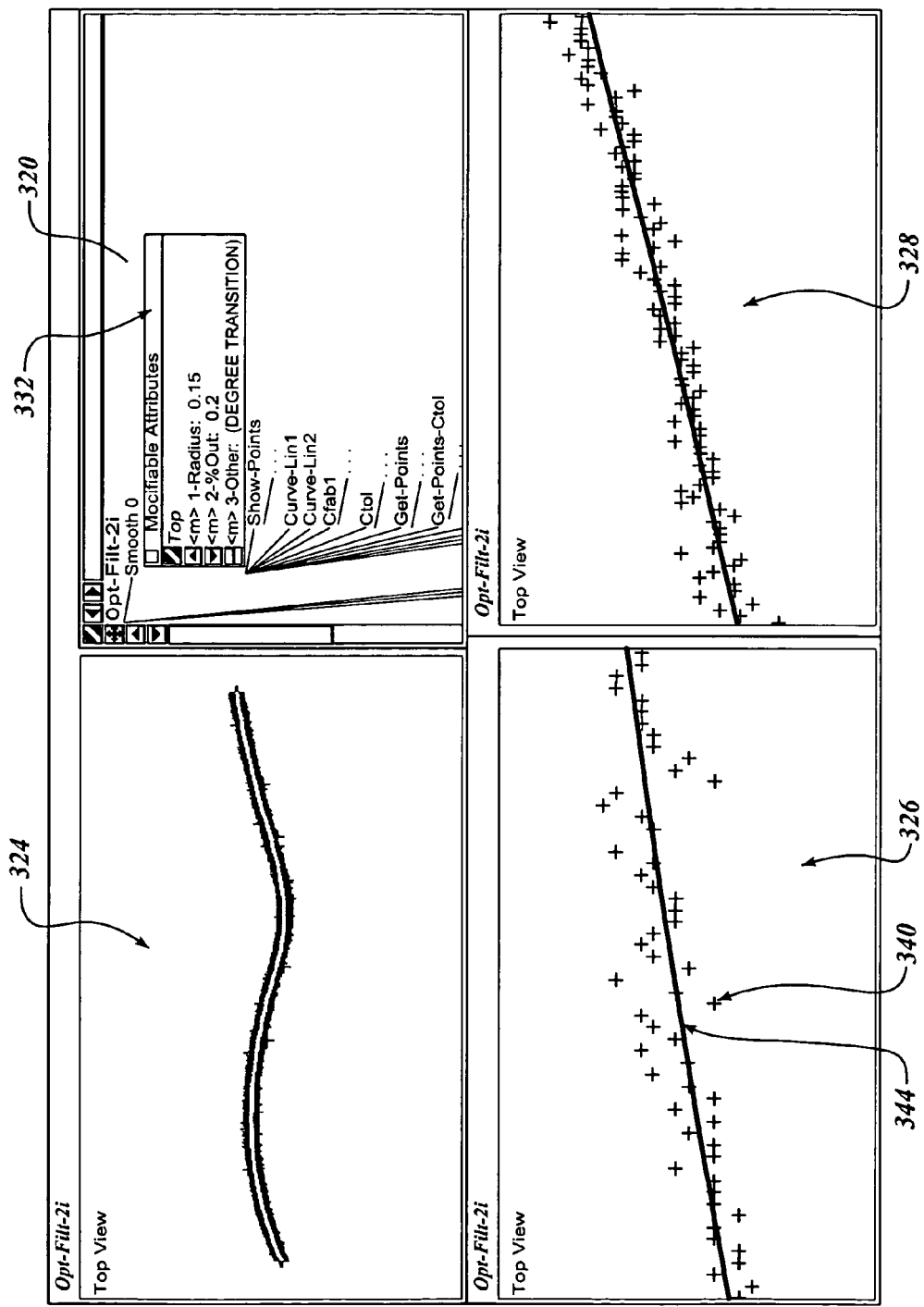
FIGS. 5–10 illustrate screen shots of a graphical user interface showing an application program that performs the processes of FIGS. 2, 3A and 3B.

FIG. 5 illustrates a screen shot of a user interface of the application program as displayed on the display device 28 (FIG. 1). The user interface includes a variable setting window 320 adjacent to windows 324–328 that illustrate various zoomed views of data points of the raw data 300. In the variable setting window 320, the user uses the interface device (keyboard 32 or mouse 34) or some other user interface device of the computer system 20 to access a modifiable attributes window 332. The modifiable attributes window 332 allows the user to set a tube radius value and a percent of data points outside the tube value. The modifiable attributes window 332 may include other adjustable attributes, such as a number of curve transitions variable and a degree variable. The number of curve transitions variable is a threshold limit for the number of significant slope transitions that a generated curve would allow. Since the result is provided using the b-spline representation, the degree variable allows the researcher to control the order of the related polynomials. The default value of 3 is generally sufficient, however some data handling situations may warrant use of a different value than the cubic default. In the tube zoom view windows 326 and 328, the data points are identified by the cross hairs and a generated curve 344 is shown.

Figure 6:
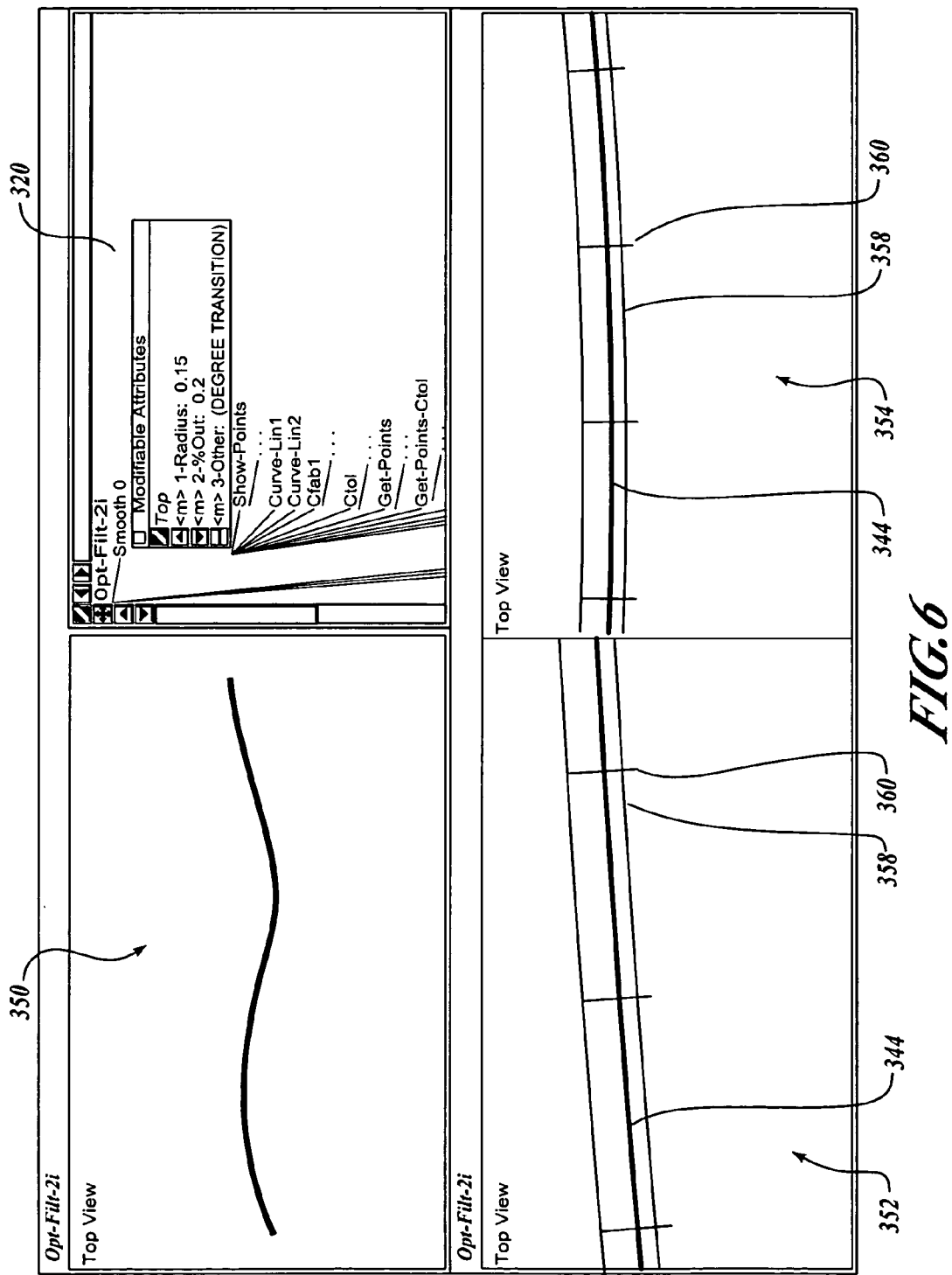
Figure 7B:
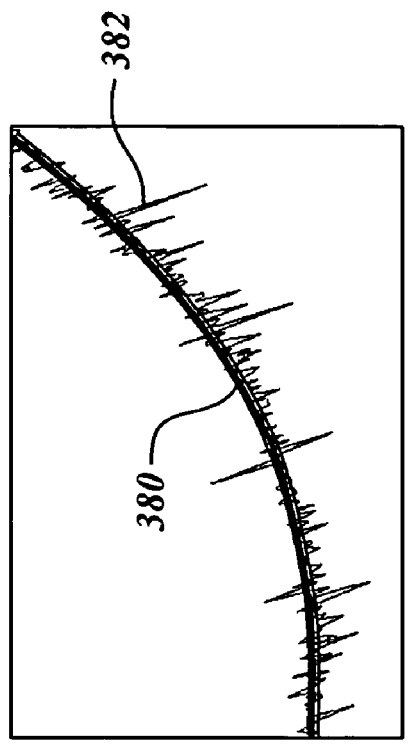
Figure 7A:
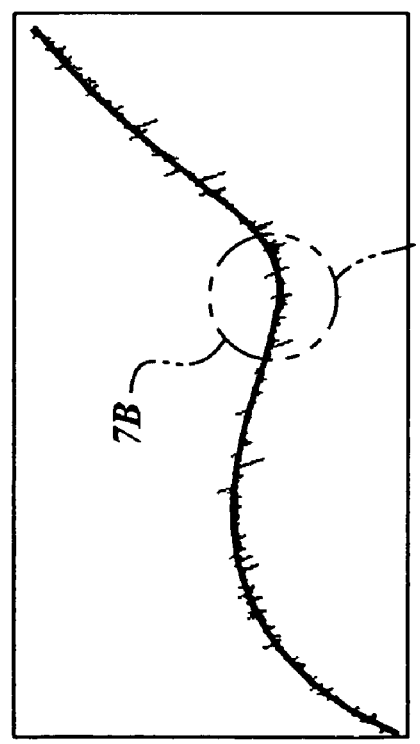

FIG. 6 is a screen shot that includes the variable setting window 320, a curve section viewing window 350, and two zoomed view windows 352 and 354 of the generated curve 344 and an associated tube 358 and 360. Curve 344 is the centerline of the tube which is represented by longitudinal lines that are in the same direction as curve 344 and by rib lines (of length 2 times the input radius) that are perpendicular to curve 344. FIGS. 7A and B illustrate a tube 380 generated by the processes 100 (FIGS. 2 and 3). A line 382 connects the data points of the raw data. The section of the tube 380 and the line 382 shown in FIG. 7B is a zoom of a section 390 shown in FIG. 7A. The tube 380 is positioned to include the generated curve (not shown). The display of the line 382 with the tube 380 allows a user to visually determine how well the application program performed in generating the curve.

Figure 8:
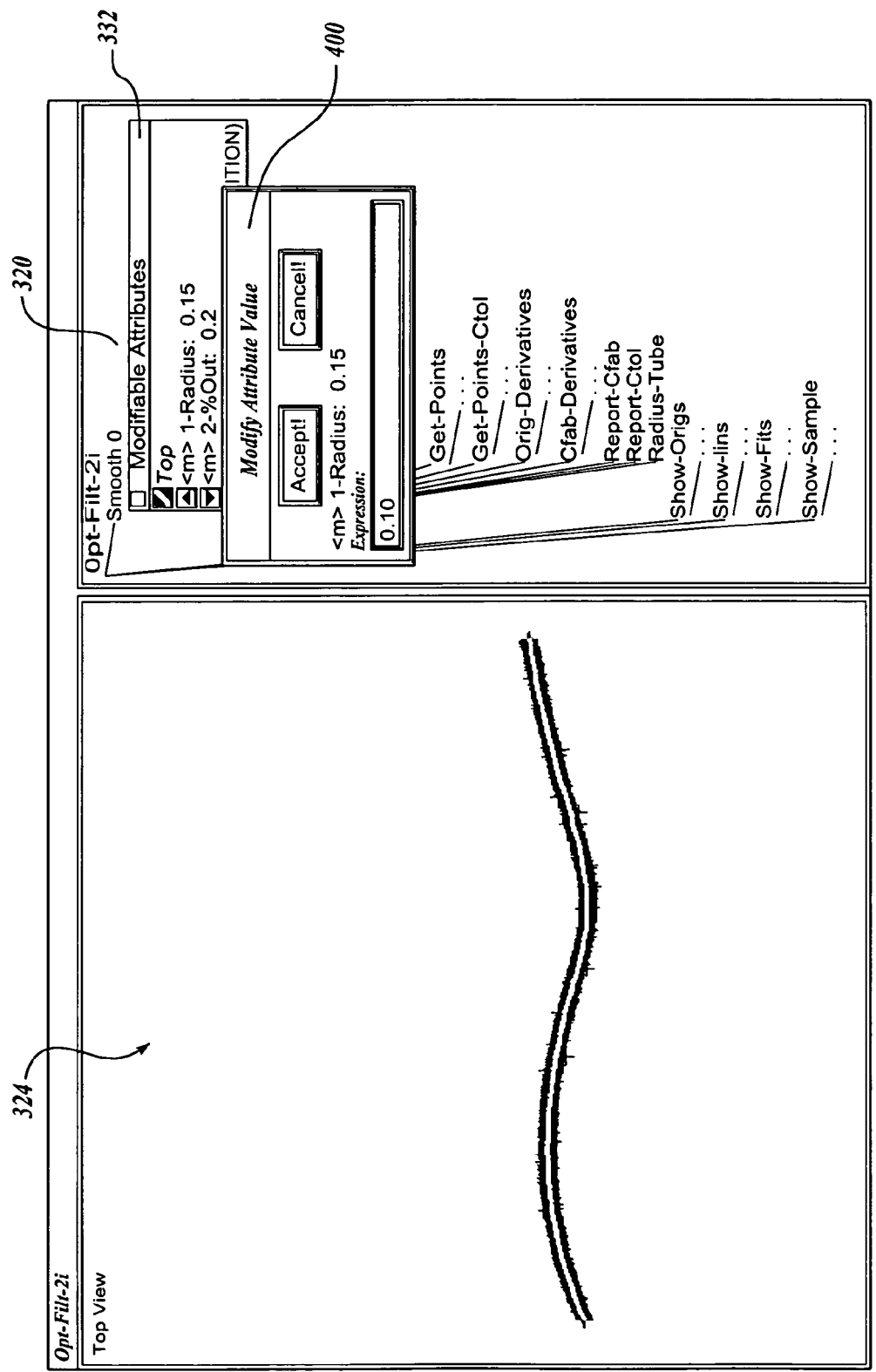

FIG. 8 illustrates a screen shot of the window 320. The window 320 includes a modify attribute value window 400 that allows a user to change any of the attributes within the modifiable attributes window 332. In this example, the user is changing the tube radius value from 0.15 to 0.10. Adjacent to the window 320 is a display area 324 for displaying at least a section of the raw data.

Figure 9:
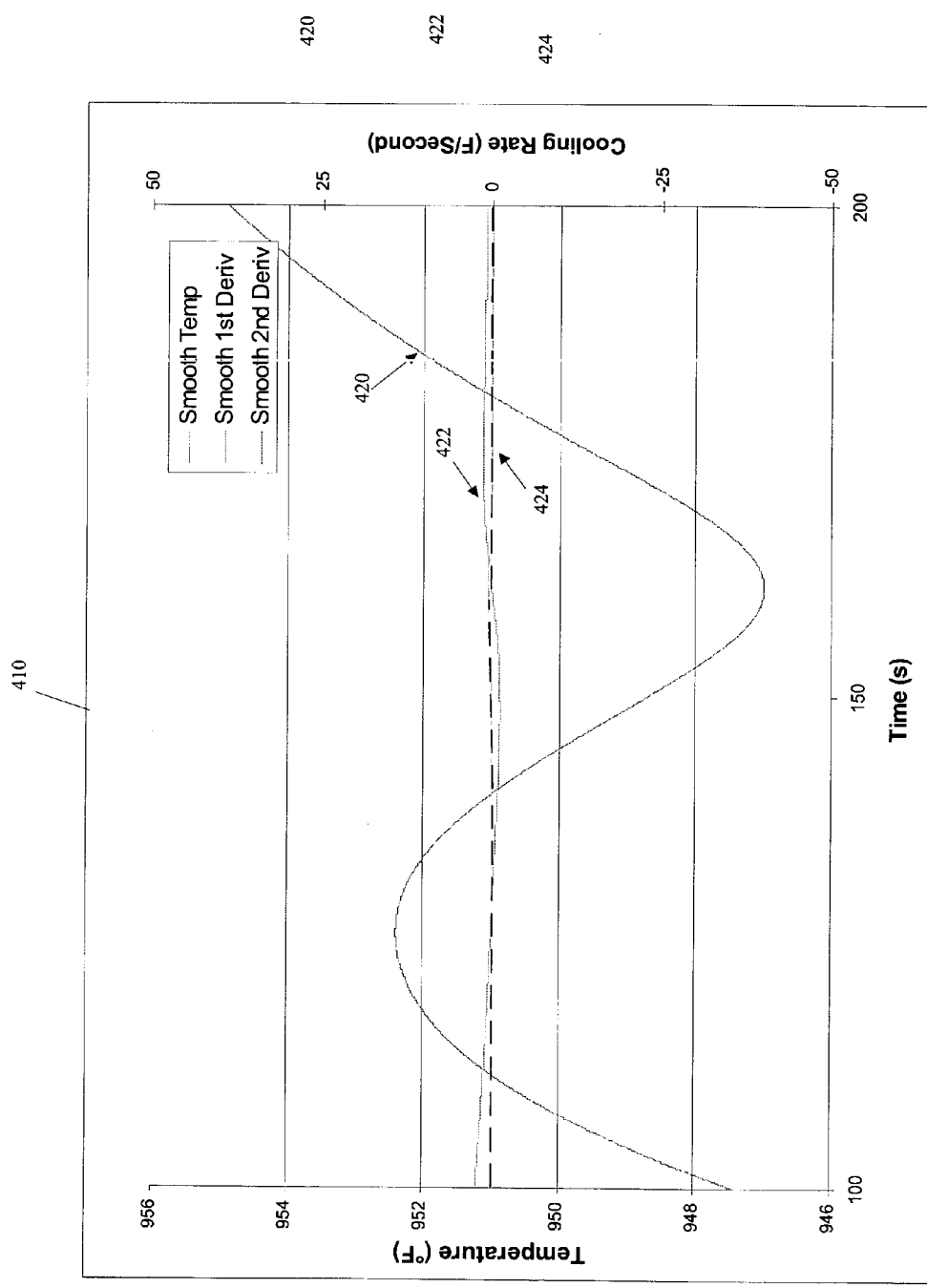

FIG. 9 illustrates a graph 410 that presents the results of the process 100. The graph 410 illustrates an optimized aluminum alloy temperature cooling curve 420 that is the result of aluminum alloy temperature cooling raw data received by the computer system 20. Also illustrated are first and second derivative curves 422 and 424, respectively, of the optimized curve 420.

Figure 10:
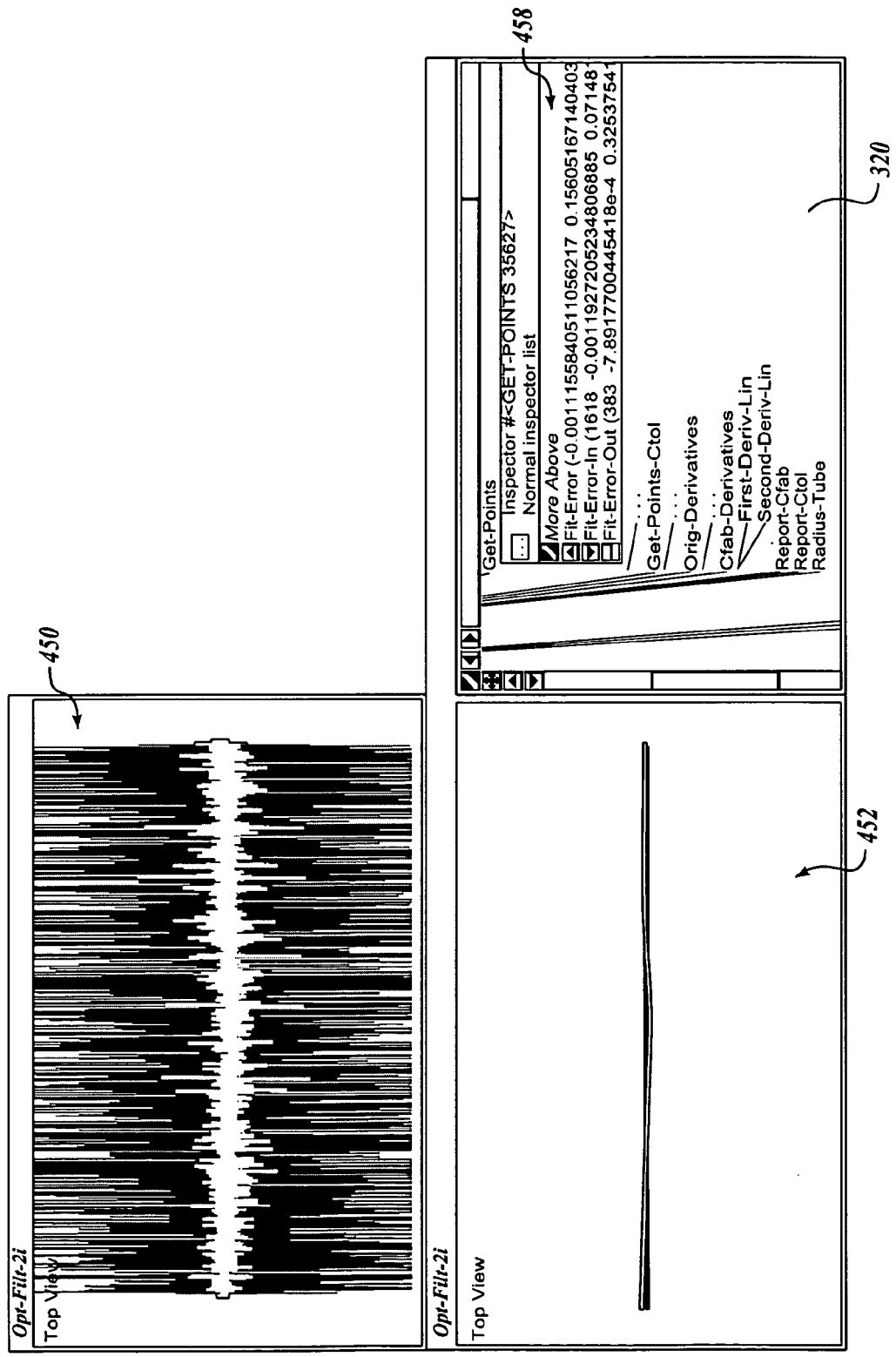
Figure 11B:
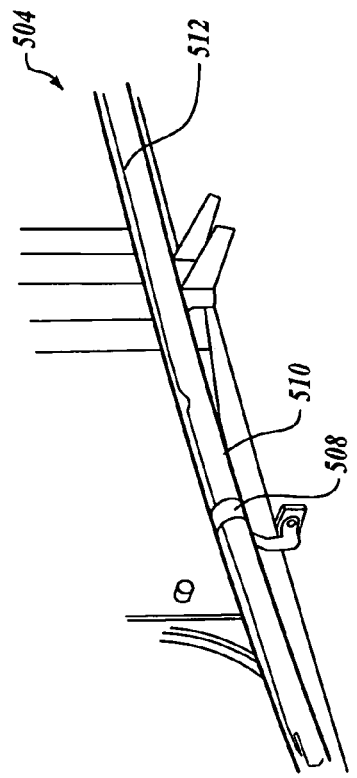
FIGS. 11A–C and 12A–C provide examples of applying the present invention to reverse engineering data for purposes of extracting a feature from a cloud of points.
Figure 11C:
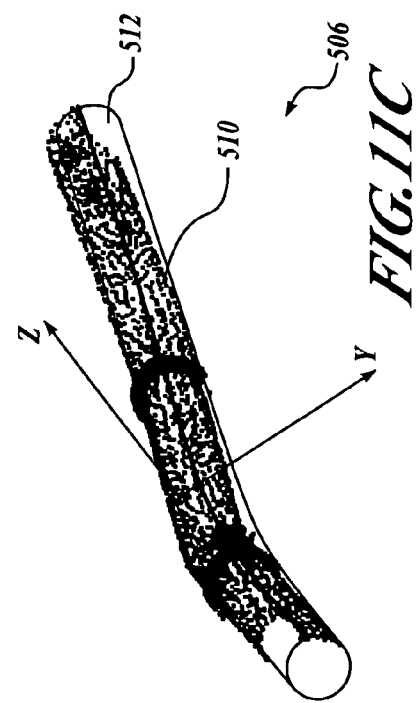
Figure 11A:
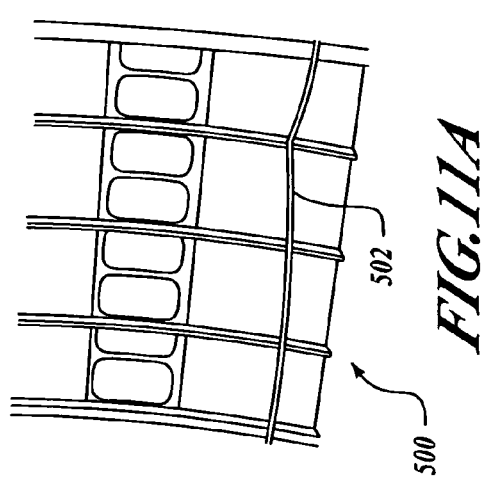
Figure 12A:
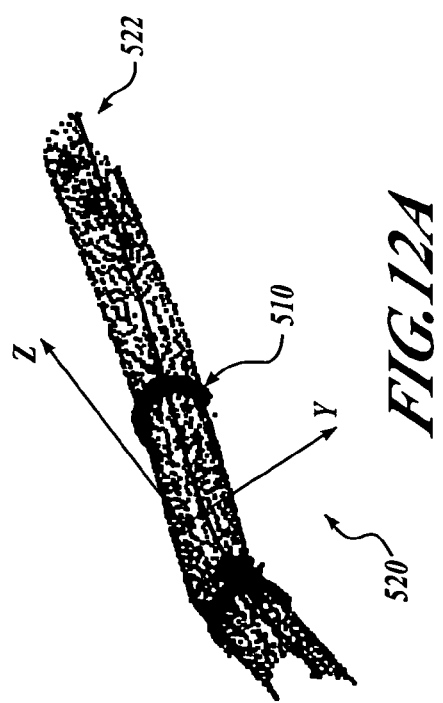
Figure 12B:
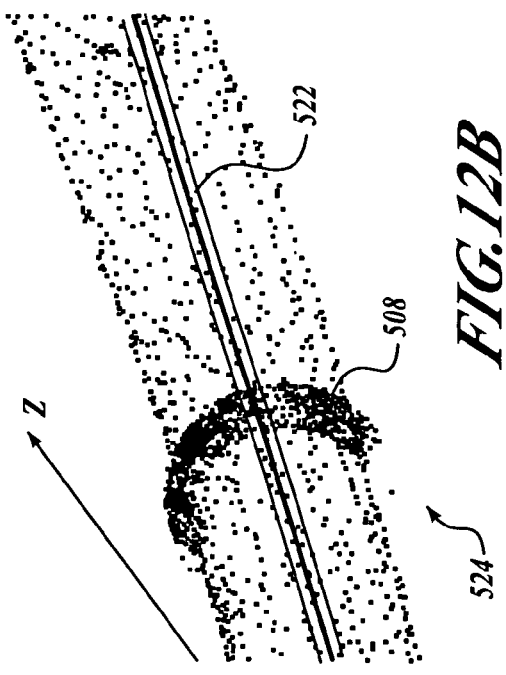
Figure 12C:
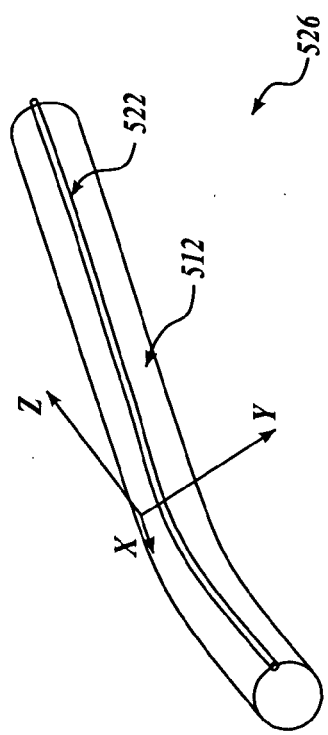

FIG. 10 illustrates a screen shot that includes a first window 450 that illustrates the raw data, a second window 452 that illustrates a section of the first and second derivative curves of the optimized curve, and the window 320 that includes an error analysis window 458. The error analysis window 458 presents the fit error rate of the optimized curve for all of the data points, the fit error rate for the optimized curve of the data points that are within the tube, and the fit error rate of just the data points that are outside of the defined tube. The data included in the error analysis window 458 may be presented in various formats to the user on the display device 28 or may be printed on a printing device (not shown).

FIG. 11 illustrates a reverse engineering example that applies the invention to discover a tube within a massive set of sampled points. Window 500 shows a portion of data obtained through advanced point sampling methods. The view of Window 500 includes millions of points that represent frames, stringers, tubes (to-be-discovered Tube 502), wire bundles, and other components from an existing aircraft (length across Window 500 is about 60 inches). Windows 504 and 506 are zooms into one area of Window 500. Clamp 508 and Tube 512 are common to both views. Tube 512 is a geometric entity that represents the to-be-discovered Tube 502. The other items in Windows 504 and 506 are points. The points in Window 506 have been decimated to allow for ease of viewing.

FIG. 12 illustrates the process of finding a seam within the points for the tube using the invention. Window 520 shows the same view as Window 506 and includes the points and the radius tube (Tube 522) that surrounds the seam. Window 520 is a zoom that shows the relationship between the points and Tube 522. The center line of Tube 522 is the seam of the to-be-discovered Tube 502 (Window 500). Clamp 508 is visible in Windows 520 and 524 to show a common reference point. Window 524 shows both the radius tube (Tube 522) and the discovered tube (Tube 508). The mechanism supported by the invention requires minimal human intervention in terms of defining the scope that is based upon the intuitive concept of a seam.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method for generating a curve that represents raw data, the method comprising:
   (a) setting a base value for defining weight values for each data point of inputted raw data;
   (b) generating a curve for representing the raw data based on at least a portion of the data points and the set base value, where the base value is information that includes a radius value for defining a tube having the curve as a centerline; and
   (c) outputting the generated curve.

2. The method of claim 1, further comprising:
   (d) setting a threshold value for indicating an allowable percentage of data points not used during the generation of the curve, wherein (b) is further based on the set threshold value.

3. The method of claim 1, wherein outputting further comprises displaying the generated curve.

4. The method of claim 1, further comprising:
   (d) generating error information relating to how well the generated curve fits with at least a portion of the data points.

5. The method of claim 1, wherein (b) further comprises:
   (i) setting a base curve;
   (ii) setting a weight value for each of the data points;
   (iii) determining error values for each of the data points based on the base curve;
   (iv) adjusting the curve based on the determined error values;
   (v) adjusting the weight values based on the determined error values;
   (vi) determining error values for each of the data points having a weight value greater than a predefined weight value threshold;
   (vii) adjusting the curve based on the error values determined at (vi); and
   (viii) repeating (v)–(vii) until a complete state is asserted.

6. The method of claim 5, wherein the curve is a b-spline curve defined by a plurality of b-spline components.

7. The method of claim 6, wherein adjusting the curve at (iv) is performed by adjusting one or more b-spline components based on the determined error values of proximate data points.

8. The method of claim 7, wherein (vii) comprises adjusting at least one b-spline component based on the determined error values of proximate data points that have weight values greater than the weight value threshold.

9. The method of claim 5, further comprising asserting a complete state if the result of (v) indicates that all the weight values of the data points are equal to a tube threshold value.

10. The method of claim 9, wherein when all the weight values of the data points are equal to the tube threshold value, all the data points are within the tube.

11. The method of claim 5, further comprising asserting a complete state if a predefined time threshold has been reached.

12. The method of claim 5, further comprising asserting a complete state if the number of repetitions of (v)–(vii) exceeds a predefined threshold.

13. The method of claim 5, further comprising asserting a complete state if a sum of all the weight values of the data points is less than a threshold value.

14. The method of claim 5, further comprising asserting a complete state if a cancel operation function has been activated.

15. The method of claim 5, further comprising:
   setting a percentage threshold value for indicating an allowable percentage of data points not used to generate the curve, wherein generating the curve is further based on the set percentage threshold value; and
   asserting a complete state if the percentage of data points not used to generate the curve is greater than the set percentage threshold value.

16. A system for generating a curve that represents raw data, the system comprising:
   a first means for setting a base value for defining weight values for each data point of inputted raw data;
   a second means for generating a curve for representing the raw data based on at least a portion of the data points and the set base value, where the base value is information that includes a radius value for defining a tube having the curve as a centerline; and
   a third means for outputting the generated curve.

17. The system of claim 16, further comprising:
   a fourth means for setting a threshold value for indicating an allowable percentage of data points not used during the generation of the curve, wherein the second means is further based on the set threshold value.

18. The system of claim 16, wherein the third means includes displaying the 15 generated curve.

19. The system of claim 16, further comprising:
   a fourth means for generating error information relating to how well the generated curve fits with at least a portion of the data points.

20. The system of claim 16, wherein the second means further comprises:
   a first submeans for setting a base curve;
   a second submeans for setting a weight value for each of the data points;
   a third submeans for determining error values for each of the data points based on the base curve;
   a fourth submeans for adjusting the curve based on the determined error values;

a fifth submeans for adjusting the weight values based on the determined error values;

a sixth submeans for determining error values for each of the data points having a weight value greater than a predefined weight value threshold;

a seventh submeans for adjusting the curve based on the error values determined by the sixth submeans; and an eighth means for returning to the fifth means until a complete state is asserted.

21. The system of claim 20, wherein the curve is a b-spline curve defined by a plurality of b-spline components.

22. The system of claim 21, wherein the fourth submeans is performed by adjusting one or more b-spline components based on the determined error values of proximate data points.

23. The system of claim 22, wherein the seventh submeans comprises a means for adjusting at least one b-spline component based on the determined error values of proximate data points that have weight values greater than the weight value threshold.

24. The system of claim 20, further comprising a ninth submeans for asserting a complete state if all the weight values of the data points are equal to a tube threshold value.

25. The system of claim 24, wherein when all the weight values of the data points are equal to the tube threshold value, all the data points are within the tube.

26. The system of claim 20, further comprising a ninth submeans for asserting a complete state if a predefined time threshold has been reached.

27. The system of claim 20, further comprising a ninth submeans for asserting a complete state if the number of returns to the fifth means exceeds a predefined threshold.

28. The system of claim 20, further comprising a ninth submeans for asserting a complete state if a sum of all the weight values of the data points is less than a threshold value.

29. The system of claim 20, further comprising a ninth submeans for asserting a complete state if a cancel operation function has been activated.

30. The system of claim 20, further comprising:

a ninth submeans for setting a percentage threshold value for indicating an allowable percentage of data points not used to generate the curve, wherein generating the curve is further based on the set percentage threshold value; and a tenth submeans for asserting a complete state if the percentage of data points not used to generate the curve is greater than the set percentage threshold value.

31. A system for generating a curve that represents raw data, the system comprising:

memory for storing a curve generation application program;

a user interface;

a display device; and a processor for executing the stored curve generation application program, the processor coupled to the memory, the user interface, and the display device, the executed curve generation application program comprising:

a first component for receiving raw data;

a second component for setting a base value for defining weight values for each data point of inputted raw data;

a third component for generating a curve for representing the raw data based on at least a portion of the data points and the set base value where the base value is information that includes a radius value for defining a tube having the curve as a centerline; and a fourth component for outputting the generated curve to the display device.

32. The system of claim 31, wherein the curve generation application program further comprises:

a fifth component for setting a threshold value for indicating an allowable percentage of data points not used during the generation of the curve, wherein the third component is further based on the set threshold value.

33. The system of claim 31, wherein the third component generates error information relating to how well the generated curve fits with at least a portion of the data points and the fourth component outputs the generated error information to the memory or the display device.

34. The system of claim 31, wherein the second component further comprises:

a first subcomponent for setting a base curve;

a second subcomponent for setting a weight value for each of the data points;

a third subcomponent for determining error values for each of the data points based on the base curve;

a fourth subcomponent for adjusting the curve based on the determined error values;

a fifth subcomponent for adjusting the weight values based on the determined error values;

a sixth subcomponent for determining error values for each of the data points having a weight value greater than a predefined weight value threshold;

a seventh subcomponent for adjusting the curve based on the error values determined by the sixth subcomponent; and an eighth subcomponent for returning to the fifth subcomponent until a complete state is asserted.

35. The system of claim 34, wherein the curve is a b-spline curve defined by a plurality of b-spline components.

36. The system of claim 35, wherein the fourth subcomponent is performed by adjusting one or more b-spline components based on the determined error values of proximate data points.

37. The system of claim 34, wherein the seventh subcomponent comprises a subcomponent for adjusting at least one b-spline component based on the determined error values of proximate data points that have weight varies greater than the weight value threshold.

38. The system of claim 34, further comprising a ninth subcomponent for asserting a complete state if the result of the fifth subcomponent indicates that all the weight values of the data points are equal to a tube threshold value.

39. The system of claim 38, wherein when all the weight values of the data points are equal to the tube threshold value, all the data points are within the tube.

40. The system of claim 34, further comprising a ninth subcomponent for asserting a complete state if a predefined lime threshold has been reached.

41. The system of claim 34, further comprising a ninth subcomponent for asserting a complete state if the number of returns to the fifth subcomponent exceeds a predefined threshold.

42. The system of claim 34, further comprising a ninth subcomponent for asserting a complete state if a sum of all the weight values of the data points is less than a threshold value.

43. The system of claim 34, further comprising a ninth subcomponent for asserting a complete state if a cancel operation function has been activated.

44. The system of claim 34, further comprising:

a ninth subcomponent for setting a percentage threshold value for indicating an allowable percentage of data points not used to generate the curve, wherein generating the curve is further based on the set percentage threshold value; and a tenth subcomponent for asserting a complete state if the percentage of data points not used to generate the curve is greater than the set percentage threshold value.

* * * * *